US007835647B2

(12) United States Patent
Beausoleil et al.

(10) Patent No.: US 7,835,647 B2
(45) Date of Patent: Nov. 16, 2010

(54) METHOD AND SYSTEM OF TRACKING OPTICAL BEAM SHIFT

(75) Inventors: Raymond G. Beausoleil, Redmond, WA (US); William M. Tong, San Francisco, CA (US); Alexandre M. Bratkovski, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 618 days.

(21) Appl. No.: 11/975,228

(22) Filed: Oct. 17, 2007

(65) Prior Publication Data

US 2009/0103930 A1 Apr. 23, 2009

(51) Int. Cl.
*H04B 10/10* (2006.01)
(52) U.S. Cl. .................. 398/131; 398/129; 398/164; 398/209; 398/213
(58) Field of Classification Search ................ 398/129, 398/131, 164, 209, 213
See application file for complete search history.

(56) References Cited

U.S. PATENT DOCUMENTS

| 6,075,603 | A | 6/2000 | O'Meara et al. |
| 6,088,505 | A | 7/2000 | Hobbs |
| 6,195,475 | B1 | 2/2001 | Beausoleil, Jr. et al. |
| 6,285,817 | B1 | 9/2001 | Hobbs |
| 6,763,157 | B1 | 7/2004 | Williams et al. |
| 2002/0149757 | A1 | 10/2002 | Kelsey et al. |
| 2004/0057669 | A1 | 3/2004 | Botham |
| 2004/0223684 | A1 * | 11/2004 | Weinkam et al. .............. 385/16 |

FOREIGN PATENT DOCUMENTS

| JP | 10-022918 | 1/1998 |
| WO | WO 02/069050 A2 | 9/2002 |
| WO | WO 2005/079194 A2 | 9/2005 |

OTHER PUBLICATIONS

HPDC, "Method and System of Tracking Optical Beam Shift", Internat'l Search Report for PCT/US2008/011823, filed Oct. 15, 2008. Report issued in Korean Intellectual Property Office, Apr. 2, 2009.

* cited by examiner

*Primary Examiner*—Leslie Pascal

(57) ABSTRACT

An optical interconnect includes an optical transmitter having a plurality of optical sources; a light sensing array configured to receive optical beams emitted from the optical sources; and a beam tracking module in communication with the light sensing array. The beam tracking module is configured to calculate a displacement of at least one of the optical beams by extrapolating an extremum from cross-correlation data obtained between at least a portion of a sample reading from the light sensing array and at least a portion of a plurality of shifted versions of a reference reading from the light sensing array. A related method includes calculating a displacement of an optical beam by extrapolating an extremum from cross-correlation data obtained between a sample reading of the optical beam and at least a portion of a plurality of shifted versions of a reference reading from the light sensing array.

20 Claims, 11 Drawing Sheets

METHOD AND SYSTEM OF TRACKING OPTICAL BEAM SHIFT

BACKGROUND

Light beams or optical signals are frequently used to transmit digital data between electronic devices, both over long distances and between adjacent circuit boards. A light beam may be modulated as needed to carry data. An optical signal may also be used for other purposes including position or motion sensing, measurement, etc.

Consequently, optical technology plays a significant role in modern electronics, and many electronic devices employ optical components. Examples of such optical components include optical or light sources such as light emitting diodes and lasers, waveguides, fiber optics, lenses and other optics, photo-detectors and other optical sensors, optically-sensitive semiconductors, and others.

Systems making use of optical components often rely upon the precise manipulation of optical energy, such as a beam of light, to accomplish a desired task. This is especially true in systems utilizing light for high-speed, low-energy data communication between circuit boards. The manipulation of the optical signal may include the processes of modulating data onto the beam of light and directing the beam of light to an intended receiver.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
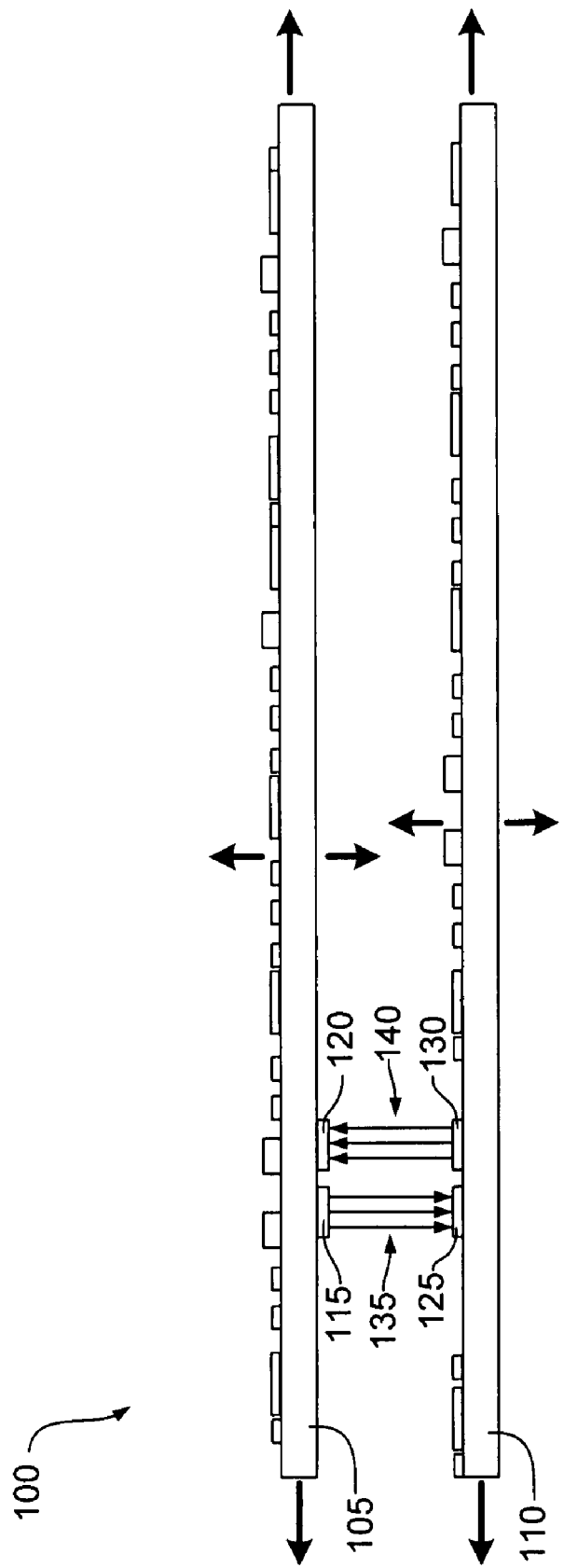
FIG. 1 is a diagram of an illustrative inter-board data communication system, according to principles described herein.

As noted above, light or optical beams can be used for a variety of purposes, including the transmission of data. Additionally, it may be desirable to communicate optically over multiple channels to increase bandwidth and/or reliability, without occupying a large space on a circuit board. Furthermore, it may also be desirable to minimize optical impedance, interference, and/or distortion in such systems. However, when optical beams are used to communicate data between physically separate electronic components, such as in separate circuit boards, maintaining correct alignment between the components is needed.

One factor that can affect the alignment between optical components on separate circuit boards is acoustic noise from mechanical components, such as fans. This acoustic noise and consequent vibrations in the system may introduce physical displacement to optical sources and/or optical receivers, which may alter the alignment between optical components and, consequently, disrupt or render less-effective the optical transmission of data.

A prior optical solution to providing data transmission between circuit board components includes using plastic waveguides to transmit an optical signal bearing data to the edge of a board, couple that signal into optical waveguides in a backplane of a circuit board rack, and then transmit the signal into another waveguide on another circuit board. In addition to waveguide fabrication costs and problems associated with optical losses at waveguide junctions, this solution in general has a longer physical data path than free space optical data transmission between components.

While free space optical data transmission solutions offer significant advantages over waveguide and electrical conductor solutions, they also generally present the aforementioned alignment issues. Moreover, optical components may occupy a significant amount of circuit board area when multiple optical channels are implemented. Hence, it may be desirable to provide a free space optical interconnect system for inter-component data transmission between circuit boards that is resistant to misalignment problems and enables multi-channel communication while occupying minimal amounts of board space.

To accomplish these and other goals, the present specification discloses systems and methods relating to spatially tracking an optical beam with a light sensing array.

As used in the present specification and in the appended claims, the term "optical energy" refers to radiated energy having a wavelength generally between 10 nanometers and 500 microns. Optical energy as thus defined includes, but is not limited to, ultraviolet, visible, and infrared light. A beam of optical energy may be referred to herein as a "light beam" or "optical beam."

As used in the present specification and in the appended claims, the term "optical source" refers to a device from which optical energy originates. Examples of optical sources as thus defined include, but are not limited to, light emitting diodes, lasers, light bulbs, and lamps.

As used in the present specification and in the appended claims, the term "optical receiver" refers to a device configured to detect optical energy and output a corresponding electrical signal. Examples of optical receivers as thus defined include, but are not limited to, photodiodes, phototransistors, and optical sensors.

Many of the functional units described in this specification have been labeled as modules in order to more particularly emphasize their implementation independence. For example, modules may be implemented in software for execution by various types of processors. An identified module of executable code may, for instance, have one or more physical or logical blocks of computer instructions that may, for example, be organized as an object, procedure, or function. Nevertheless, the executables of an identified module need not be physically located together, but may have disparate instructions stored in different locations which, when joined logically together, compose the module and achieve the stated purpose of the module. For example, a module of executable code could be a single instruction, or many instructions, and may even be distributed over several different code segments, among different programs, and across several memory devices.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to illustrative systems and methods.

Illustrative Systems

Referring now to FIG. 1, an illustrative inter-board communication system (100) is shown. The illustrative system (100) includes a first circuit board (105) and a second circuit board (110). Data is transferred between the first and second circuit boards (105, 110) using optical interconnects having optical transmitters (115, 130) configured to transmit optical beams (135, 140) encoded with data to corresponding light sensing arrays (120, 125). Each of the circuit boards (105, 110) in the present example has an optical transmitter (115, 130) and a light sensing array (120, 125) to enable two-way optical communication between the two circuit boards (105, 110).

Each of the optical transmitters (115, 130) includes a plurality of optical sources, thus enabling multiple optical beams to be transmitted to the corresponding light sensing arrays (120, 125) concurrently. Each such optical beam may be a separate channel for data transmission. Additionally, each of the light sensing arrays (120, 125) includes a plurality of light sensing elements configured to output an electrical signal corresponding to optical attributes of the optical energy incident upon those light sensing elements. In many embodiments, the light sensing arrays (120, 125) have a significantly greater number of light sensing elements than the number of optical sources in the corresponding optical transmitters (115, 130). In these embodiments, an optical beam transmitted from an individual optical source in an optical transmitter (115, 130) is typically detected by multiple light sensing elements in the corresponding light sensing array (120, 125).

In some embodiments, the optical sources in the optical transmitters (115, 130) may be lasers, such as vertical cavity surface emitting lasers (VCSELs), diode lasers, or other semiconductor-based lasers. Where advantageous, some embodiments of the optical transmitters (115, 130) or light sensing arrays (120, 125) may include lenses to create an optical path, focus, or other manipulation of the optical beams (135, 140) emitted from the optical transmitters (115, 130) or received by the sensing arrays (120, 125).

As mentioned above, circuit boards (105, 110) having optical transmitters (115, 130) and light sensing arrays (120, 125) may be susceptible to adverse effects caused by acoustic noise and consequent vibrations. In many cases, this acoustic noise may be the result of mechanical activity by one or more fans associated with the circuit boards (105, 110). The acoustic noise may cause physical displacement of the circuit boards (105, 110), such as in the directions indicated by the arrows in FIG. 1, and thus may misalign the optical transmitters (115, 130) and the light sensing arrays (120, 125).

In some embodiments, the optical transmitters (115, 130) and/or the light sensing arrays (120, 125) may be moved relative to the circuit boards (105, 110) that house them using microelectromechanical systems (MEMS) or other mechanical devices in the circuit boards (105, 110). In this way, misalignments and/or rotation between corresponding optical transmitters (115, 130) and light sensing arrays (120, 125) caused by vibration of the circuit boards (105, 110) may be offset, thus preventing potential data loss from board misalignment or rotation. As will be explained in more detail in other examples, a beam tracking module on one of the circuit board (105, 110) may detect optical beam drift and provide feedback to the components altering the physical position of the optical components (115, 130, 120, 125).

Figure 2:
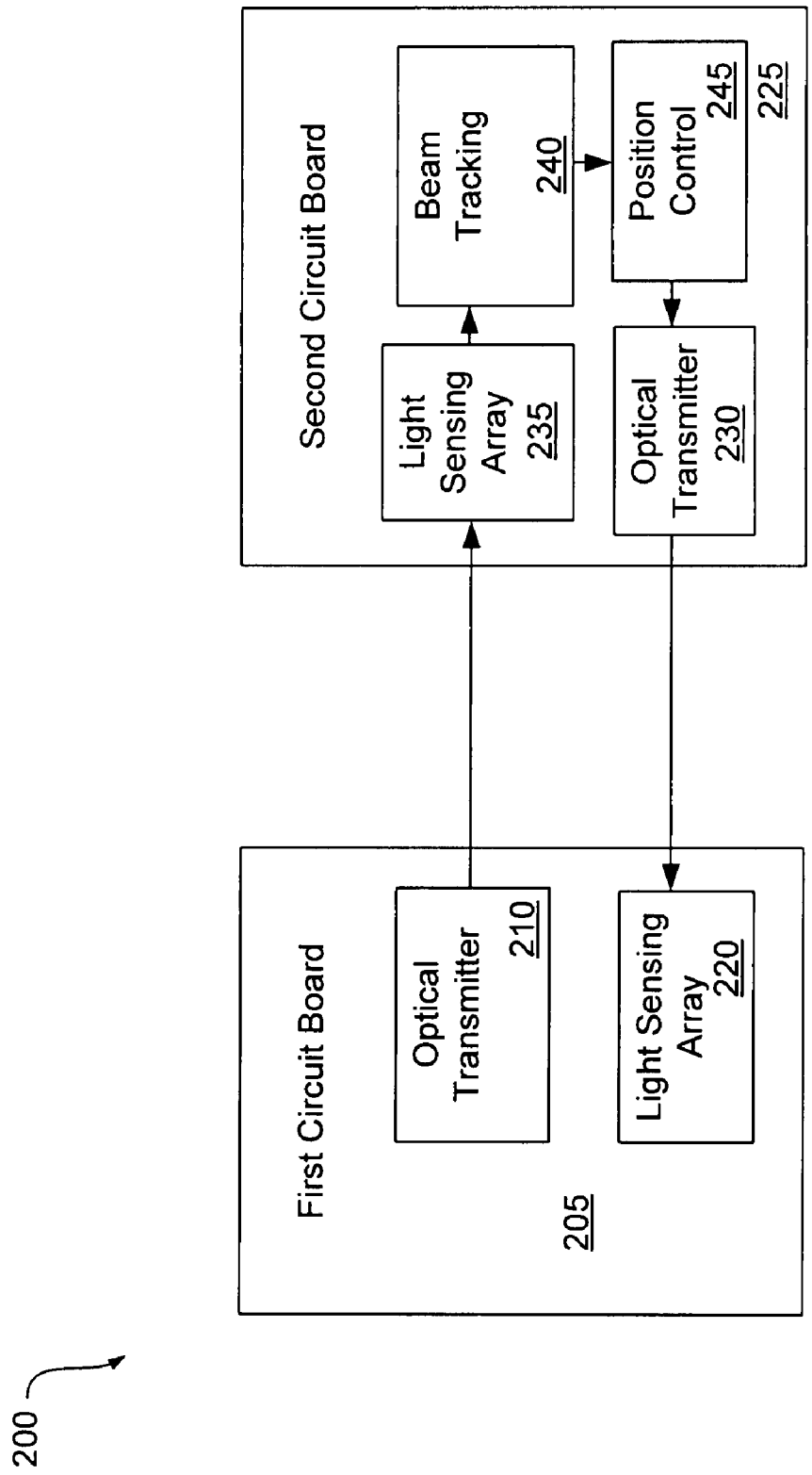
FIG. 2 is a block diagram of an illustrative system of tracking optical beam shift, consistent with principles described herein.

Referring now to FIG. 2, a block diagram of an illustrative system (200) of tracking optical beam shift is shown. The system includes first and second circuit boards (205, 225). As in the illustrative system (100) described previously, the circuit boards (205, 225) of the present system (200) are designed for two-way inter-board communication. Each of the circuit boards (205, 225) has an optical transmitter (210, 230, respectively) and a corresponding light sensing array (220, 235). The optical transmitter (210) of the first circuit board (205) is configured to transmit data optically to the light sensing array (235) of the second circuit board (225). Likewise, the optical transmitter (230) of the second circuit board (225) is configured to transmit data optically to the light sensing array (220) of the first circuit board (220).

In the present example, the second circuit board (225) includes a beam tracking module (240) in communication with the light sensing array (235). The beam tracking module tracks the displacement of at least one optical beam received in the light sensing array (235). The optical beam displacement may occur due to acoustic noise, vibrations, thermal expansion or contraction, or other mechanical influences.

The beam tracking module (240) calculates the displacement of the optical beams by obtaining a reference reading from the light sensing array (235). A sample reading from the same light sensing array (235) is obtained after the reference reading, and a cross-correlation function is performed on at least a portion of various shifted versions of the reference reading and at least a portion of the sample reading. The cross-correlation data are then modeled according to possible displacements represented by the shifted versions of the reference reading, and an actual displacement calculation is obtained by extrapolating a calculated extremum from the modeled data. The sample reading may then become the reference reading for the next displacement calculation as the process is repeated. This process will be discussed in more detail with reference to FIGS. 4-8.

Optical communication between the two circuit boards (205, 225) may be temporarily halted for a very brief period of time as the sample and reference readings are taken from the light sensing array. Generally, detrimental effects of mechanical displacement from acoustic noise, vibrations, etc. in the circuit boards (205, 225) may be offset and compensated when the beam tracking module (240) actively operates and calculates the displacement of the optical beams at a faster rate than the frequencies of the vibrations (which are typically between approximately 1 and 10 kHz), but more slowly than the data transfer rate (typically greater than 500 MHz for optical data).

The second circuit board (225) also includes a position controller (245) in communication with the beam tracking module (240) that is configured to physically move the light sensing array (235) of the second board. The position controller (245) receives feedback from the beam tracking module (240) and physically moves the light sensing array (235) to compensate for any misalignment (i.e. displacement) detected. The position controller (245) may include MEMs, electric motors, gears, tracks, and other hardware needed to move the light sensing array (235) to compensate for the calculated drift.

In some embodiments, either or both of the optical transmitter (230) and the light sensing array (235) may be physically moved by the position controller. In some embodiments, both the first and second circuit boards (205, 225) include beam tracking modules (240) and position controllers (245) to compensate for the vibrations and other physical movements of the system (100).

Figure 3:
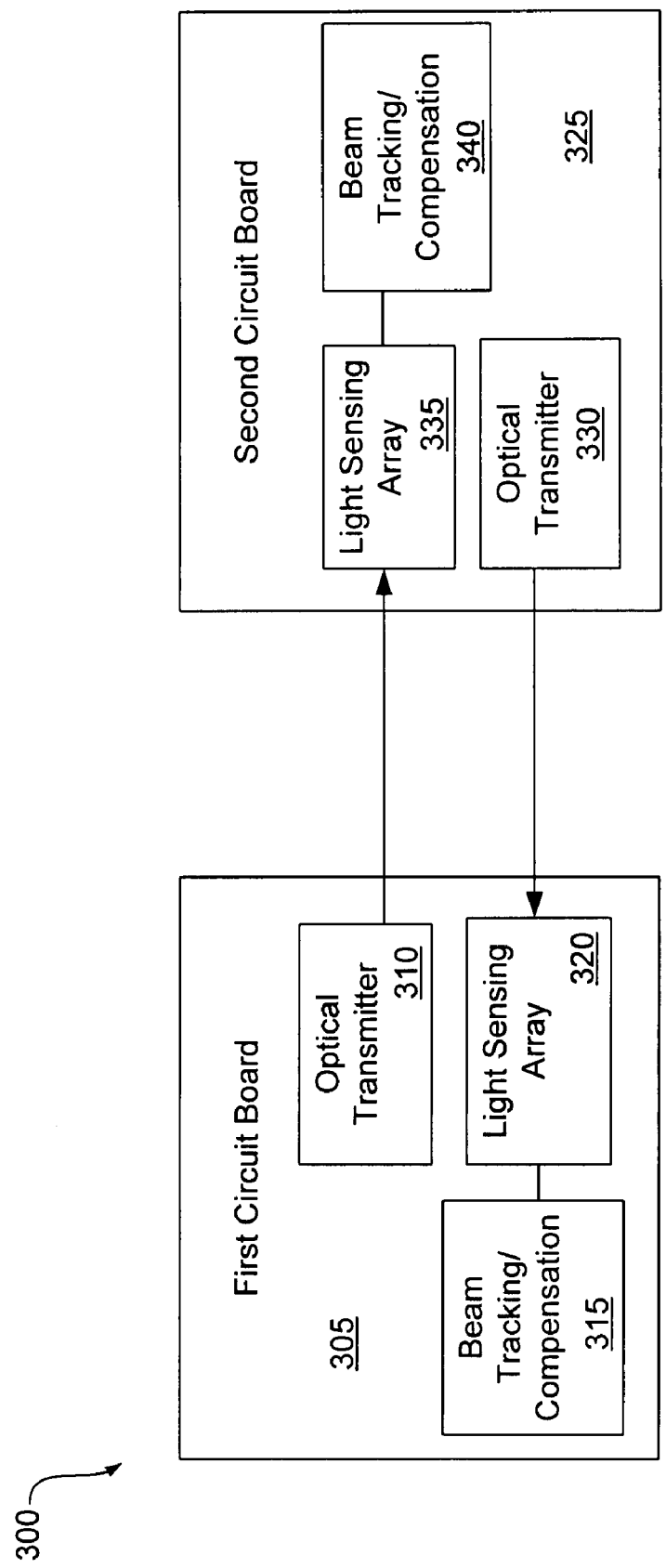
FIG. 3 is a block diagram of an illustrative system of tracking optical beam shift, consistent with principles described herein.

Referring now to FIG. 3, a block diagram of another illustrative system (300) of tracking and compensating for optical beam shift is shown. The system (300) includes first and second circuit boards (305, 325). Similar to previously described examples, the circuit boards (305, 325) of the present system (300) are designed for two-way optical communication between boards. Each of the circuit boards (305, 325) has an optical transmitter (310, 330, respectively) and a corresponding light sensing array (320, 335). The optical transmitter (310) of the first circuit board (305) is configured to transmit data optically to the light sensing array (335) of the second circuit board (325). Likewise, the optical transmitter (330) of the second circuit board (325) is configured to transmit data optically to the light sensing array (320) of the first circuit board (305).

In this particular system (300), multi-channel optical data transfer between the circuit boards (305, 325) may occur as multiple optical beams encoded with data are emitted from each of the optical transmitters (310, 330) and received and demodulated in corresponding light sensing arrays (335, 320, respectively). Each of the light sensing arrays (320, 335) includes a plurality of light sensing elements. Certain of the light sensing elements in each of the light sensing arrays (320, 335) may be designated to measure optical energy received from specific individual optical beams emitted by specific elements of the optical transmitters (330, 310). By assigning specific groups of light sensing elements in the light sensing arrays (320, 335) to specific optical beams, the separate channels of data encoded on the different optical beams may be demodulated and routed correctly to their intended destinations.

However, as described above, vibrations and other mechanical movement in the circuit boards (305, 325) may shift the optical beams such that the optical beams are detected by different light sensing elements in the light sensing arrays (320, 335) than were originally assigned to the various optical beams. Without compensation or correction, this may result in the loss of data and/or cross-talk between channels, resulting in poor performance of the system (300).

To overcome this issue, each of the first and second circuit boards (305, 325) of the present example includes a beam tracking and compensation module (315, 340, respectively). The beam tracking and compensation modules (315, 340) are in communication with their respective light sensing arrays (320, 335) and track the drift and physical displacement changes of the individual optical arrays. As beam shifts are detected, the assignment of particular light sensing elements in the light sensing arrays (320, 335) to particular optical beams or channels of information may be altered to compensate for the beam shifts. By dynamically maintaining and updating which light sensing elements correspond to which of the optical beams and related data channels, continuous data flow may occur in spite of vibrations A beam tracking and compensation module (315, 340) dynamically calculates the displacement of the optical beams detected by the light sensing elements by obtaining a reference reading from the corresponding light sensing array (320, 335). A sample reading from the same light sensing array (320, 335) is obtained after the reference reading, and a cross-correlation function is performed on at least a portion of various shifted versions of the reference reading and at least a portion of the sample reading. The cross-correlation data are then modeled according to possible displacements represented by the shifted versions of the reference reading, and an actual displacement calculation is obtained by extrapolating a calculated extremum from the modeled data. This process will be discussed in more detail in reference to FIGS. 4-8.

As discussed above, optical communication between the two circuit boards (305, 325) may be temporarily halted for a very brief period of time as the sample and reference readings are taken from the light sensing array. Generally, detrimental effects of mechanical displacement from vibrations in the circuit boards (305, 325) may be offset and compensated when the beam tracking and compensation modules (315, 340) actively operate and calculate the displacement of the optical beams at a faster rate than the acoustic frequencies (which are typically between approximately 1 and 10 kHz) causing displacement, but more slowly than the data transfer rate (typically greater than 500 MHz for optical data).

The present system (300) is also advantageous in that compensation for optical beam drift is accomplished passively, without requiring active steering or movement of any of the optical components on the circuit boards. This passive approach to beam tracking and shift compensation requires much less energy than traditional approaches.

Figure 4B:
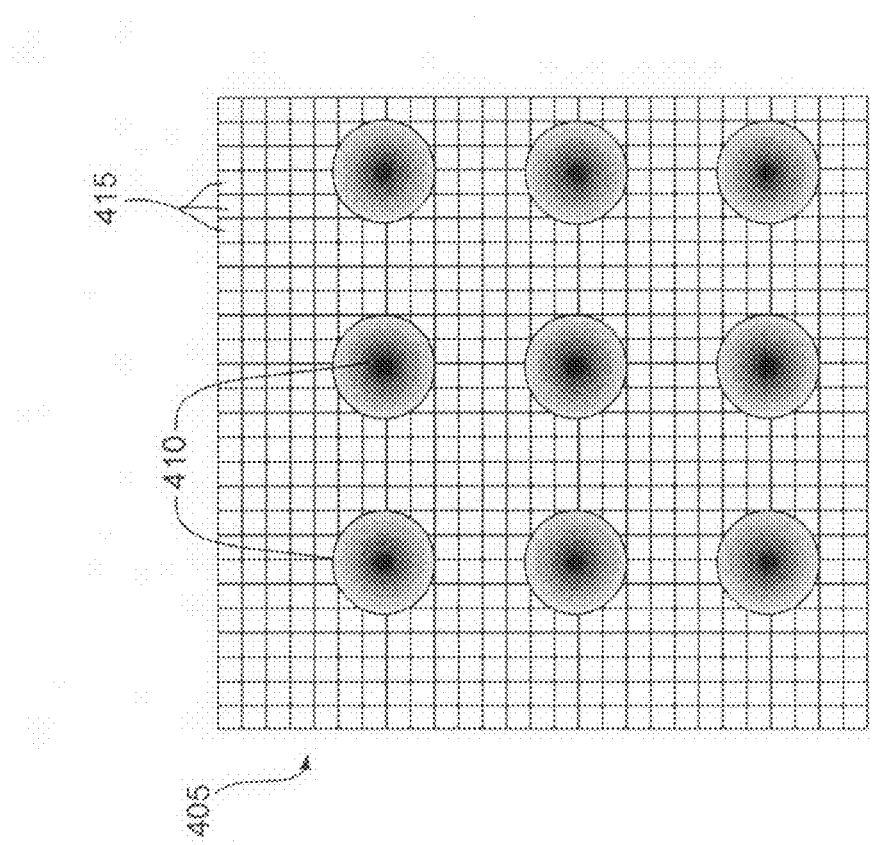
FIGS. 4A and 4B are diagrams of an illustrative light sensing array, consistent with principles described herein.
Figure 4A:
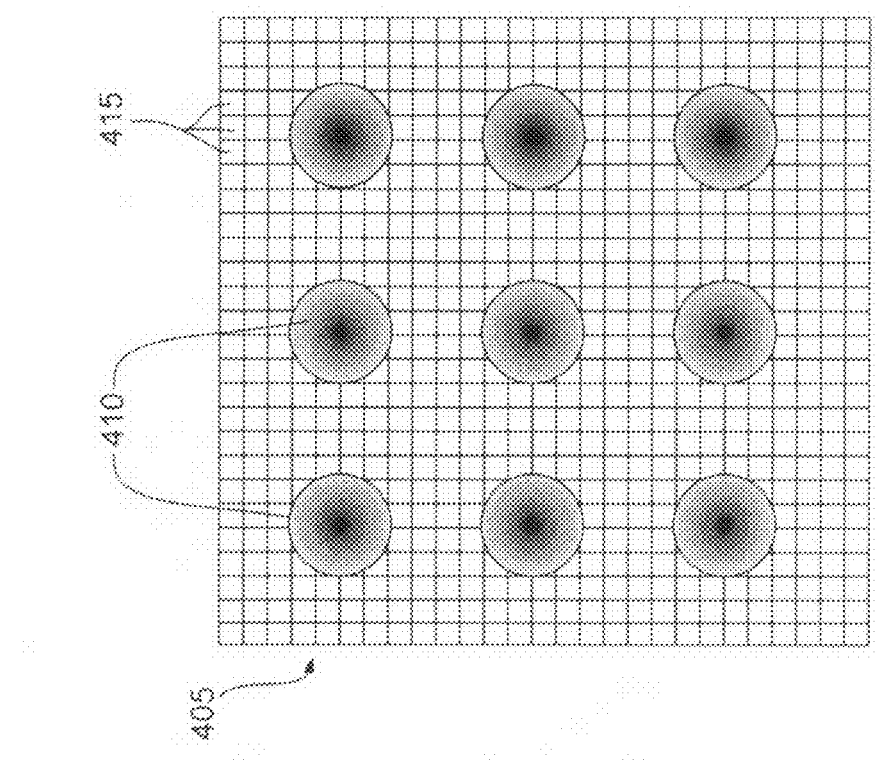

Referring now to FIGS. 4A and 4B, an illustrative light sensing array (405) is shown with a illustrative patterns indicating how optical beams (410) from an optical transmitter (210, FIG. 2) may strike the light sensing array (405). The light sensing array (405) includes a plurality of light sensing elements (415).

The light sensing elements (415) are configured to detect optical energy incident on the elements (415) and output an electrical signal indicative of the optical energy. For example, a light sensing element (415) may output an electrical signal characteristic of the intensity of the optical energy detected. In other embodiments, the light sensing elements (415) may output electrical signals indicative of the characteristic wavelength of the optical energy, for example using colored filters. In still other embodiments, the light sensing elements (415) may produce a simple digital output indicating the presence of optical energy that surpasses a characteristic threshold. As data may be encoded onto optical beams (410) by varying the intensity, characteristic wavelength, and/or pulse lengths of the optical beams, the electrical signals output by the light sensing elements (415) may then be used to decode the data from the optical beams (410) and forward the data to their intended destination(s).

As explained previously, certain of the light sensing elements (415) are associated with specific optical beams (410), and the data encoded on each of the optical beams (410) is demodulated using the electrical output from the light sensing elements (415) associated with that optical beam. However, which specific light sensing elements (415) are assigned to individual optical beams (410) is adjusted or reconfigured, as described herein, as optical beam shift is encountered due to vibrations.

FIG. 4A shows a possible pattern of optical beams (410) on the light sensing array (405) at one instant, and FIG. 4B shows a possible pattern of the same optical beams (410) on the light sensing array (405) at a subsequent instant, after beam displacement has occurred, for example, due to acoustic noise, vibration or other factors. As shown in FIGS. 4A and 4B, the optical beams may have a Gaussian distribution with a peak intensity at the central portion of the beam being indicated by darker shading in the figures. In order to obtain optimal functionality, dataflow, and data integrity, the light sensing elements (415) that are associated with each of the optical beams (410) are adjusted according to a calculated displacement of the optical beams (410).

This calculated displacement of the optical beams (410) is performed by obtaining a reference reading from the light sensing array (405) and subsequently obtaining a sample reading for comparison to the reference reading. In the present example, FIG. 4A represents the pattern of the optical beams (410) detected by the light sensing array (405) at the time of the reference reading, and FIG. 4B represents the pattern of the optical beams (410) detected by the light sensing array (405) at the time of the sample reading.

To calculate the beam displacement (if any) that occurs between the reference reading and the sample reading, portions of the reference reading and sample reading are used.

Figure 5B:
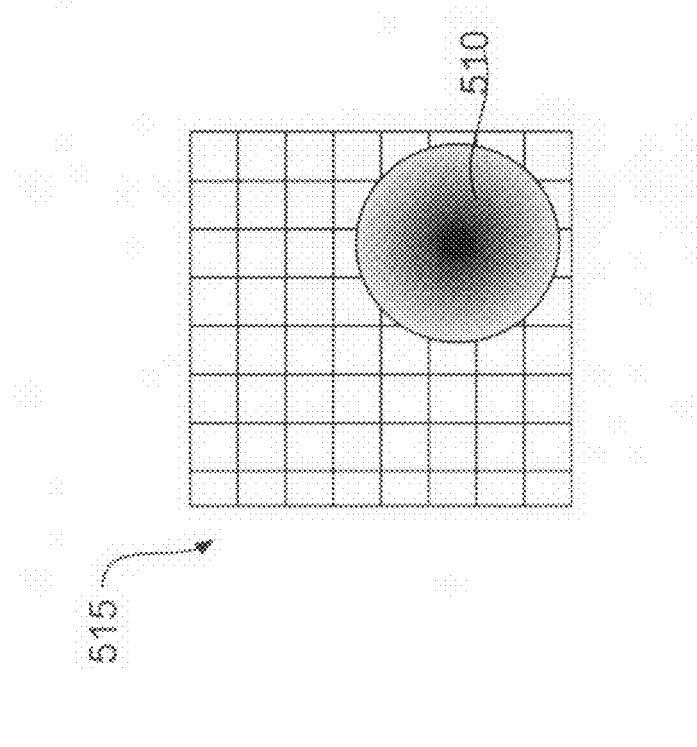
FIGS. 5A and 5B are diagrams of a portion of an illustrative light sensing array, consistent with principles described herein.
Figure 5A:
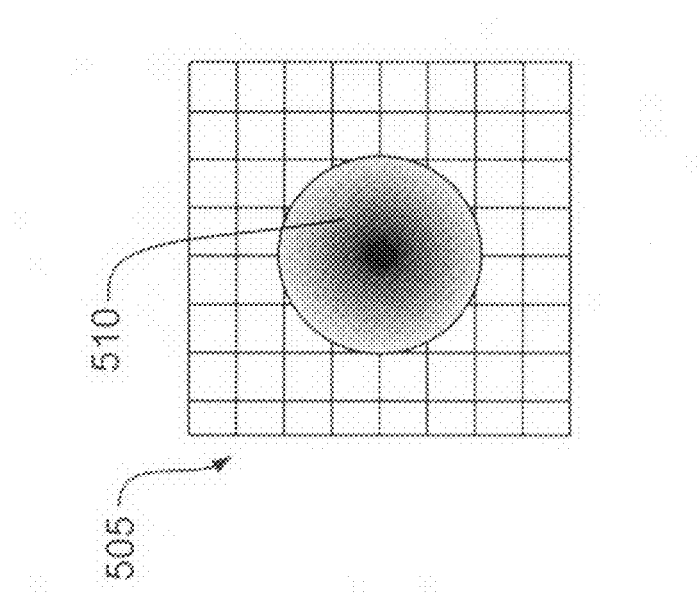

FIG. 5A shows a graphical representation of the light detected by a portion (505) of the light sensing array (405, FIG. 4) corresponding to an individual optical beam (510) at the reference reading. FIG. 5B shows a graphical representation of the light detected by the portion (515) of the light sensing array (405, FIG. 4) corresponding to the individual optical beam (510) at the subsequent sample reading.

Since each of the optical sources that emit optical beams to the light sensing array (235, FIG. 2) is located on or incorporated in the same optical transmitter (210, FIG. 2), it may be assumed that the optical sources of the transmitter (210, FIG. 2) undergo the same spatial displacements at the same time. In other words, when a spatial displacement is detected in one optical beam (510) from the optical transmitter (210, FIG. 2), it may be reasonably concluded that the other optical sources in that optical transmitter (210, FIG. 2) have undergone similar or identical displacement.

Figure 6:
FIG. 6 is a schematic illustration of the relationship between various illustrative enumerated shifts in physical position and corresponding illustrative two-dimensional displacements, consistent with principles described herein.

Referring now to FIG. 6, the displacement of the optical beams may be determined from the portions (505, 515; FIG. 5) of the reference and sample readings by computing cross-correlation data between various shifted versions of the reference portion (505) and the subsequent sample portion (515). In the cross-correlation process, the detected position of the reference portion (505) is systematically shifted in various directions that represent different possible displacements of the optical beam (510). Array (601) shows these possible displacements as numbered positions, with position 0 representing no change in position of the optical beam (510), position 1 representing a displacement up and to the left, position 2 representing a displacement directly up, and so forth. These positions represent hypothetical shift in the reference position, and allow the general cross-correlation surface to be estimated at nine discrete coordinates.

Corresponding array (602) illustrates the displacement represented by each of the hypothetical positions in terms of x and y coordinates. As will be explained below, the reference position and these hypothetical shifts are used to estimate values of the general cross-correlation surface at a set of discrete displacements, and then determine the net displacement of the peak intensity of a sample light beam. The degree of correlation of each of these comparisons, e.g., nine data points, is then fit to a Gaussian function with the extremum of the function identifying the actual displacement of the sample beam from the reference position.

Figure 7:
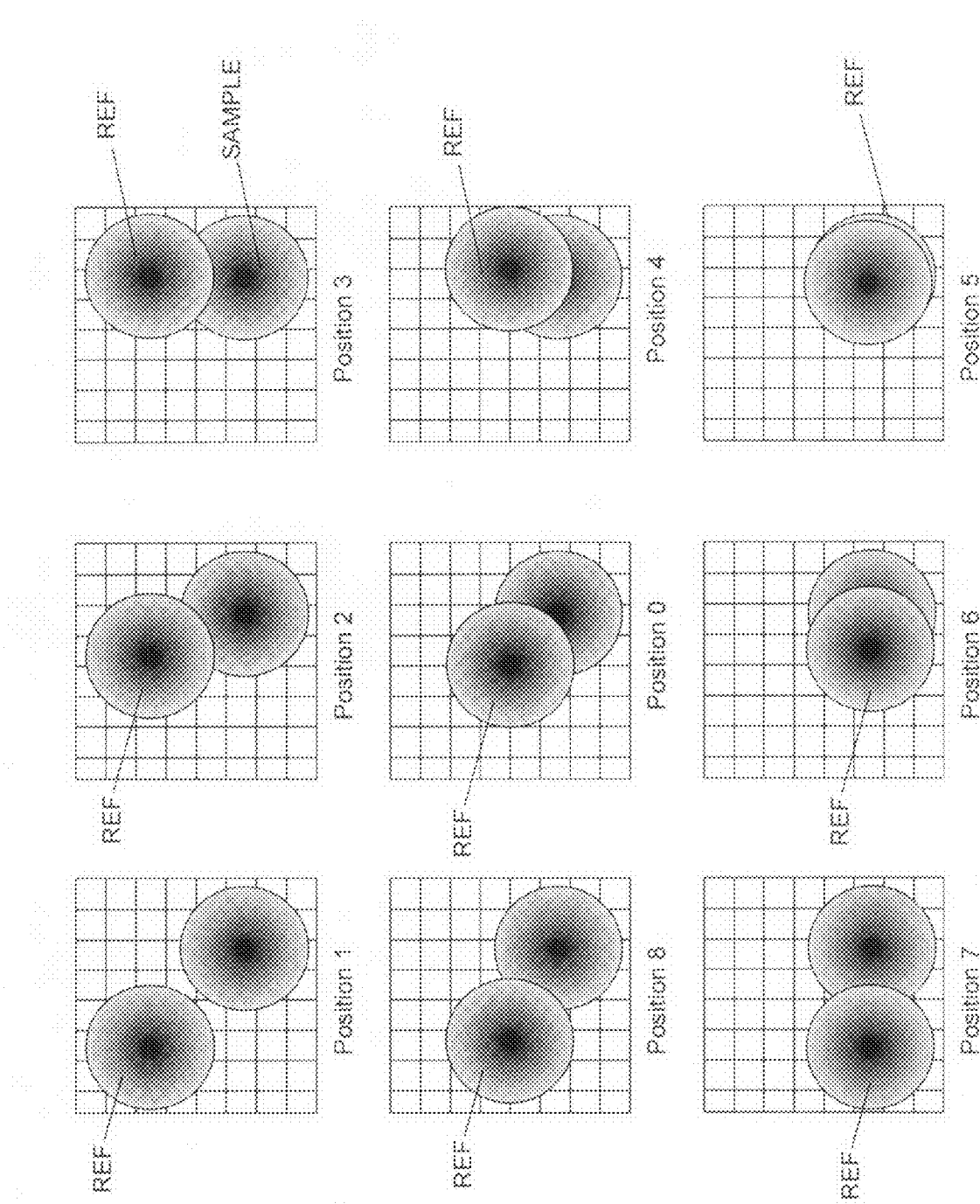
FIG. 7 is a schematic illustration of various illustrative displacements of an optical beam used to determine cross-correlation values, consistent with principles described herein.

This process is illustrated in FIG. 7. As shown in FIG. 7, a cross-correlation function between the reference and the sample or instantaneous beams is obtained by calculating the value of the cross-correlation function between the sample portion (515) and the reference portion (505) at each of the potential displacements described in Positions 0-8 and then fitting the 9 values to a two-dimensional Gaussian function. The location of the extremum represents the displacement of the instantaneous beam from the reference beam. In FIG. 7, the reference position is indicated with an illustrated reference beam (REF) in each of the "Positions." The relative location of the sample or displaced beam (SAMPLE) is indicated specifically in Position 3, but is the same in each of the illustrated "Positions." The correlation between the reference beam and the sample beam is closest at Position 5, but the correlation is not exact in the illustrated example. However, by fitting the degree of correlation at each of the Positions 0-8 to a Gaussian function, the extremum of the function will give a precise quantification of the displacement of the sample beam.

The cross-correlation function can be used to measure the displacement of the optical beam. For one-dimensional functions f(x) and g(x) the cross-correlation can be defined over the appropriate time values (t) as:

$$(f*g)_i = \sum_j f_j * g_{i+j}$$

Other choices for the cross-correlation function can be used, for example, the sum of the squares of the differences in light intensity between the sample and reference beams. Various cross-correlation functions can be used so long as there is a clear extremum in the corresponding correlation surface that can be modeled reasonably well by a general second-order function. In some embodiments, the cross-correlation function may be evaluated in both x and y dimensions between the sample portion (515) and the reference portion (505) at each of the potential displacements described by Positions 0-8 to obtain two-dimensional correlation data. The two-dimensional correlation data may then be modeled using a Gaussian or similar function to obtain a correlation surface from which an extremum may be extrapolated. The extremum corresponds to the calculated displacement position of the optical beam (510) in the time that elapses between when the reference and sample readings of the light sensing array are obtained.

One can define the correlation function for 'beam spot' overlap of intensities of the reference f(r) and the sampling g(r) beams as $$\rho_{ij} = (f(\vec{r}) \cdot g(\vec{r}))/(|f| \times |g|),$$

with a similar expression for g(r). The scalar product above, and the magnitude of the vector in the functional space are defined as $$(f \Box g) = \int dx dy f(x-x_i, y-y_i) g(x-x_j, y-y_j),$$

$$|f| = [\int dx dy f^2]^{1/2}$$

In practice, if the distribution of intensity over the spot may be assumed to be Gaussian, $f_i(\vec{r}) = f_0 \exp[-(\vec{r} - \vec{r}_j)^2/2\sigma^2]$, then $\rho_{ij} = \rho_0 \exp[(\vec{r} - \vec{r}_j)^2/4\sigma^2]$ is also Gaussian with the dispersion $2\sigma^2$, $r_{i(j)} = (x_{i(j)}, y_{i(j)})^T$ the 2-dimensional vector in the plane of the spot. Then the shift in the position measured by the 2-dimensional vector $\vec{r}_i - \vec{r}_j = (x_i - x_j, y_i - y_j)$ is found by $\chi^2$-fitting of the measured quantities $\rho_{ij}$ (9 numbers for 3×3 matrix) to the Gaussian approximation for $\rho_{ij}$ (4 unknowns). Given the character of the intensity distribution, one may be assured that even then the spot centers are separated by larger distance than σ, the direction of the shift will be determined fairly accurately, used to improve alignment, and the procedure can be repeated to achieve alignment in just a few steps.

During the tracking in real time one may estimate from a few measurement steps as described above, the position (x,y), velocity (Vx,Vy), and acceleration (Wx,Wy) of the spot at time t. One can then predict the position of the spot in time dt at the moment t+dt from the simple procedure:

$$\hat{x}(t+dt) = x(t) + v_x(t)dt + \frac{1}{2}w_x(t)dt^2,$$

$$\hat{v}_x(t+dt) = v_x(t) + w_x(t)dt,$$

Which is a prediction (marked by caret) of position and velocity, y components written in the same way. The time dt between measurements is related by frequency of measurement as f=1/dt. Then for the next step we do auto-regression $$x(t+dt) = \alpha x_m(t+dt) + (1-\alpha)x(t),$$

$$v_x(t+dt) = \beta v_{x,m}(t+dt) + (1-\beta)v_x(t),$$

Where the subscript "m" indicates the actually measured quantities, 0<α, β<1 being the smoothing coefficients optimized to reduce trajectory jittering, in other words, minimize the prediction error over the previous p+1 measurement and tracking instances $$\sum_{k=0}^{p} |x_m(t-kdt) - \hat{x}(t-kdt)|^2$$

The example above includes information only about current and previous position. Obviously, one can easily generalize this for auto-regression containing more of previous data points to further improve the quality and speed of the tracking.

As the computation of the cross-correlation data requires significant signal processing to be performed on the signals relating to the reference and sample readings, particularly "row delay" or similar processes. In many embodiments these processes are performed immediately on the signals as they are obtained from the light sensing array, before further digitization. This may increase accuracy in the final cross-correlation data obtained.

As mentioned above, it should be understood that many correlation functions and correlation surface models may be performed on the reference and sample readings, including simplifications and approximations of more complex functions. For example, a Taylor series approximation of a "sum of the squared difference" correlation function will yield similar results to the functions and models described above. A much more thorough explanation of possible processes and calculations that may be used in the present systems and methods to obtain correlation data from reference and sample readings is found in U.S. Pat. No. 6,195,475 to Raymond G. Beausoleil, Jr., et al, which is incorporated herein by reference in its entirety for all that it teaches.

Figure 8:
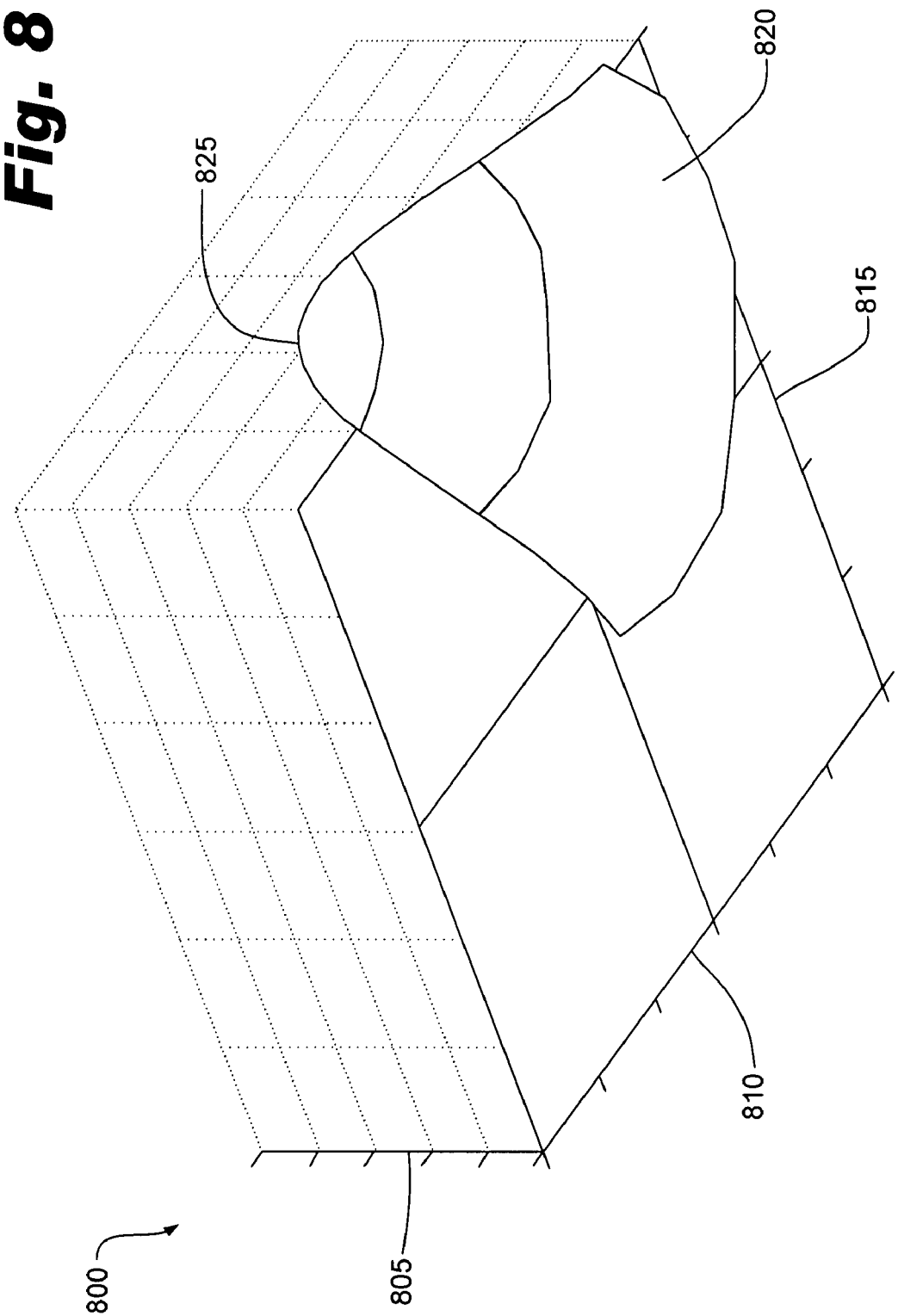
FIG. 8 is a graphical representation of an illustrative Gaussian surface corresponding to calculated optical beam displacement, consistent with principles described herein.

Referring now to FIG. 8, a graphical representation of a mathematical model (800) of the cross-correlation data obtained from the example of FIG. 7, having an illustrative Gaussian surface (820) is shown. The Gaussian surface (820) is representative of the correlation data obtained using the shifted portion of the reference reading (505, FIG. 5) and the portion of the sample reading (515). The Gaussian surface (820) models the value of the correlation data at potential displacements of the optical beam (510, FIG. 5) with respect to the x and y axes (810, 815). A value on the z-axis (805) for each x-y coordinate pair indicates the probability of the optical displacement being the vector corresponding to the x-y coordinates. The probable displacement of the optical beam (510, FIG. 5) may be calculated by extrapolating an extremum (825) from the Gaussian surface (820) and x-y coordinates that define the location of the extremum (825). In the present example, the x-y coordinates corresponding to the extremum (825) are the x-y coordinates of the calculated displacement of the optical beam (510, FIG. 5).

Once the displacement of the optical beam (510, FIG. 5) has been calculated and, by extension, that of all of the optical sources in the optical transmitter (310, FIG. 3), the displacement may be compensated for, as previously explained.

Additionally, as many vibrations experienced by circuit boards tend to be periodic and exhibit a certain degree of regularity, algorithms may be used to examine histories of beam displacement over a period of time and develop predictive corrective schemes. The predictive corrective schemes may be used to anticipate vibrations or other motion in optical components and compensate for the resultant displacement of optical beams without requiring continual calculations of the displacement of the beams.

Illustrative Methods

Figure 9:
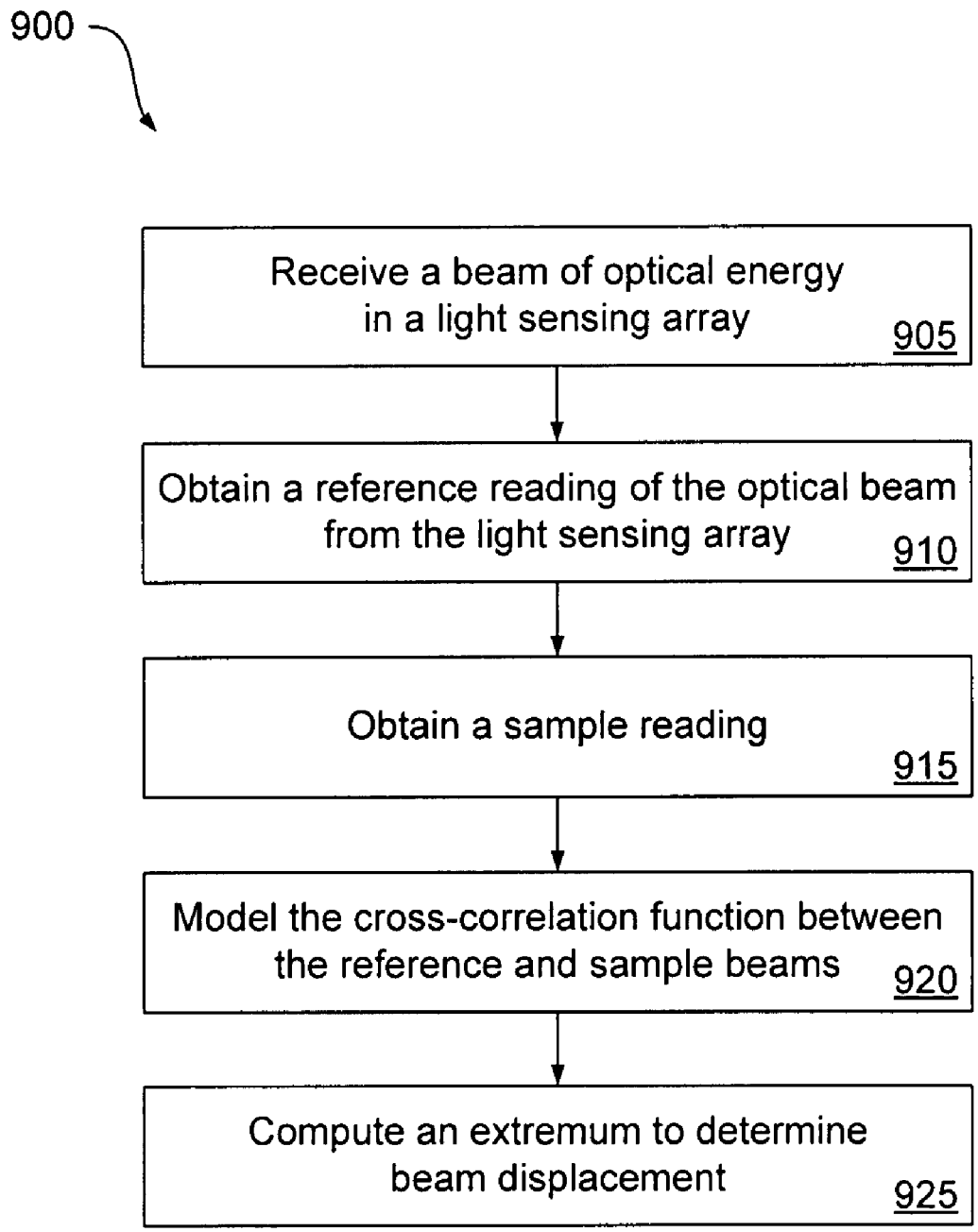
FIG. 9 is a flowchart illustrating an illustrative method of tracking optical beam shift, consistent with principles described herein.

Referring now to FIG. 9, an illustrative method (900) of tracking an optical beam is shown. The method (900) includes receiving (step 905) a beam of optical energy in a light sensing array. A reference reading of the optical beam is obtained (step 910) from the light sensing array. A sample reading of the optical beam is obtained (step 915) from the light sensing array after the reference reading has been obtained (step 910). Cross-correlation data between at least a portion of the sample reading and at least a portion of a plurality of shifted versions of the reference reading are then obtained (step 920). The cross-correlation data are then modeled (step 920) and an extremum is extrapolated (step 925) from the cross-correlation data to calculate the displacement of the optical beam. The cross-correlation data may be modeled (step 923) using, for example, a Gaussian approximation having a single extremum signifying the point of most probable displacement of the optical beam. After the displacement has been determined, the sample reading may be converted into a new reference reading.

Data may be transmitted to the light sensing array from the optical beam. Thus, the method (900) may also include the step of demodulating data carried on the optical beam from measurements of the beam in the light sensing array. The reference and sample readings may be obtained at a faster rate than the frequency of the vibrations affecting the optical beam and the light sensing array, but at a slower rate than data is transmitted. As most vibrations occur at a frequency lower than 10 kHz, and data may typically be transferred optically at a rate greater than 1 GHz, the sample and reference readings of the present method (900) may be obtained, in one example, at a rate of about 1 MHz, or once every microsecond. Data transfer may be periodically and briefly stopped while a beam tracking reading is obtained, and resumed immediately thereafter.

Figure 10:
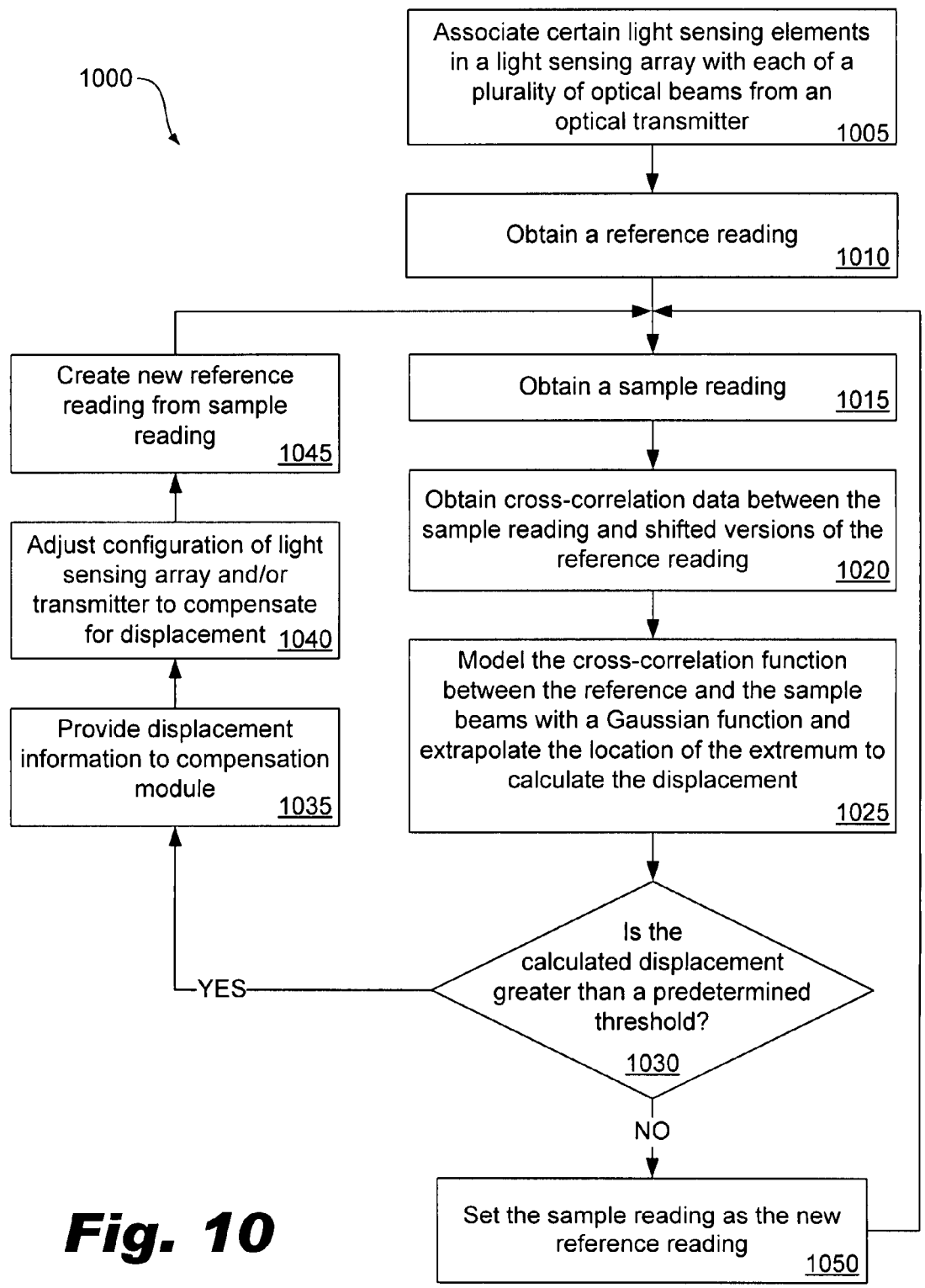
FIG. 10 is a flowchart illustrating an illustrative method of tracking optical beam shift, consistent with principles described herein.

Referring now to FIG. 10, a flowchart of an illustrative method (1000) of compensating for optical beam shift is shown. The method (1000) includes the step of associating (step 1005) certain light sensing elements in a light sensing array with each of a plurality of optical beams emitted by a transmitter. Different optical beams may carry different channels of optical data, thus it is important in some embodiments that each beam is identified properly in the measurements produced by the light sensing array. This allows for the optical data to be routed to its intended destination.

The method (1000) also includes some of the steps described previously in relation to the illustrative method (900, FIG. 9) of tracking an optical beam. These steps include obtaining (1010) a reference reading, obtaining a sample (1015) reading, obtaining (step 1020) cross-correlation data between the sample reading and shifted versions of the reference reading, modeling (step 1025) the cross-correlation data, and extrapolating (step 1025) an extremum from the modeled data to calculate a displacement of the optical beam.

As mentioned previously, the cross-correlation data may be modeled (step 1025) as a Gaussian, and the extremum may be extrapolated (step 1025) from the Gaussian model. Additionally, data may be transmitted on the optical beam and demodulated using reading of the beam from the light sensing array. The reference and sample readings may be obtained at a faster rate than the frequency of vibrations affecting the optical beam and the light sensing array, but at a slower rate than data is transmitted.

Once the displacement of the beam has been calculated (step 1025), it may then be determined whether the displacement of the beam is greater than a predetermined threshold (decision 1030). Displacements that are greater than the predetermined threshold may initiate providing (step 1035) displacement information to a compensation module and adjusting (step 1040) the configuration of the light sensing array and/or the optical transmitter to compensate for the displacement of the beam. A new reference reading is then created (step 1045), taking into account the calculated displacement of the beam, such that future displacement of the optical beam is determined with respect to the new position of the optical beam.

In some embodiments, the step of adjusting (step 1040) the configuration of the light sensing array and/or the optical transmitter to compensate for the displacement of the beam may include physically moving the light sensing array and/or the transmitter to achieve a desired alignment between the transmitter and the light sensing array. In other embodiments, the step (step 1040) may include adjusting which of the light sensing elements in the array are associated with each of the optical beams.

In the event that the displacement of the beam is not greater than the predetermined threshold (decision 1030), the sample reading may be set (step 1050) as the new reference reading, and a new sample reading may be obtained (step 1015) from the light sensing array.

The method (1000) may include repeating several times the steps of obtaining (step 1015) a new sample reading, obtaining (step 1020) cross-correlation data, modeling (step 1025) the cross-correlation data, and extrapolating (step 1025) an extremum to calculate beam displacement. In this way, a plurality of displacement measurements may be obtained, and trends can be identified. Future displacement behavior may then be predicted from the identified trends.

Figure 11:
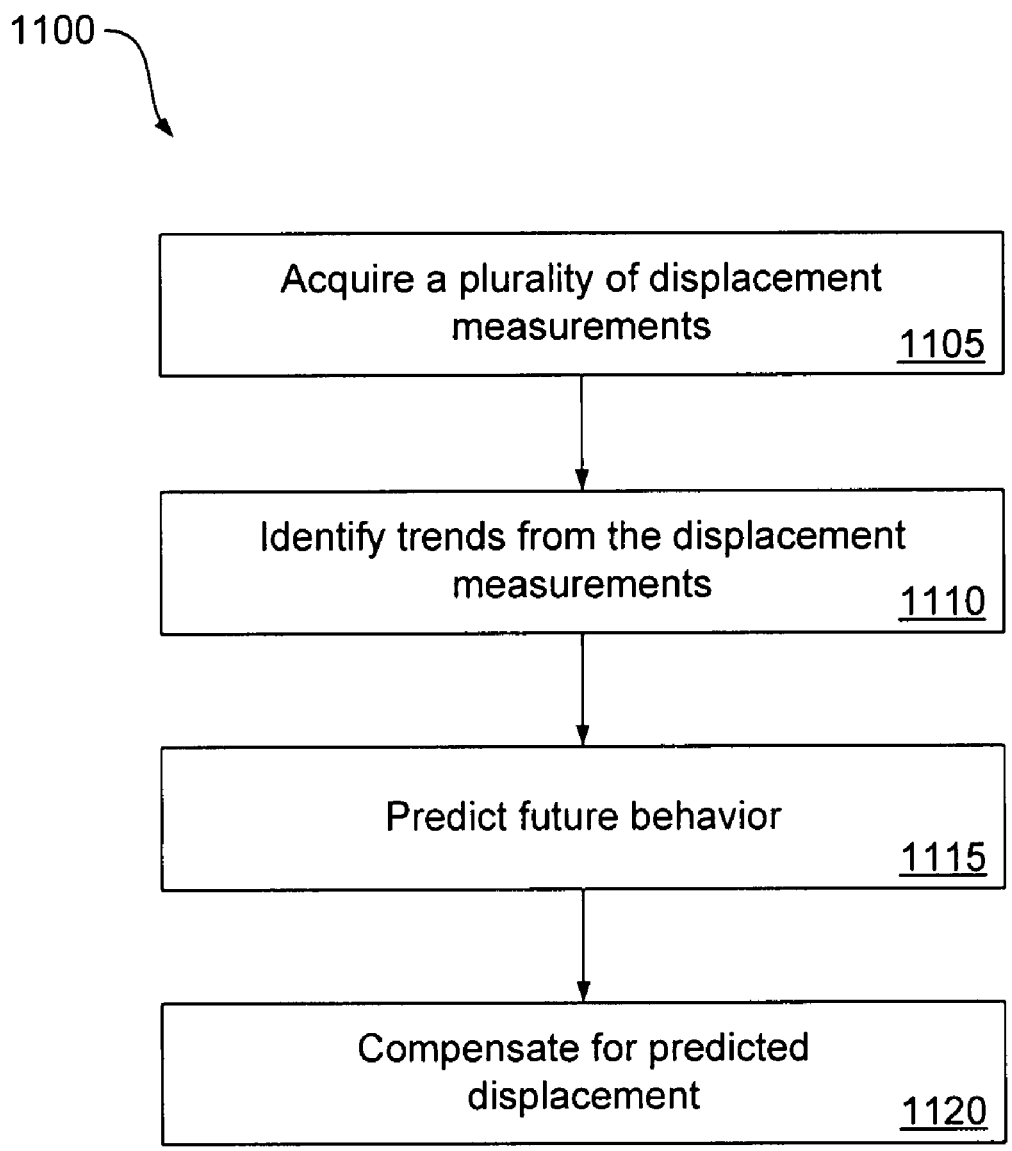
FIG. 11 is a flowchart illustrating an illustrative method of compensating for optical beam shift, consistent with principles described herein.

Referring now to FIG. 11, an illustrative method (1100) of compensating for optical beam shift is shown. The method (1100) includes acquiring (step 1105) a plurality of beam displacement measurements, identifying trends (step 1110) from the displacement measurements, predicting future behavior of the optical beam (step 1115), and compensating (step 1120) for predicted displacement.

As explained previously, vibrations and other mechanical disruptions are periodic in many systems. Thus, computer algorithms may be used to identify (step 1110) the trends in a plurality of displacement measurements to predict (step 1115) future behavior. Once this occurs, a system need not acquire reference and sample beam tracking readings from a light sensing array, but may simply run an automatic beam displacement compensation cycle based on the predicted future behavior. This compensation cycle may include adjusting the alignment between an optical transmitter and the light sensing array, adjusting which light sensing elements in an array are associated with which of a plurality of optical beams, or both.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. An optical interconnect, comprising:
    an optical transmitter having a plurality of optical sources;
    a light sensing array configured to receive optical beams emitted from said optical sources; and
    a beam tracking module in communication with said light sensing array;
    wherein said beam tracking module is configured to calculate a displacement of at least one of said optical beams by extrapolating an extremum from cross-correlation data obtained between at least a portion of a sample reading from said light sensing array and at least a portion of a plurality of shifted versions of a reference reading from said light sensing array.

2. The optical interconnect of claim 1, wherein said optical transmitter is housed on a first circuit board and said light sensing array is housed on a second circuit board.

3. The optical interconnect of claim 2, further comprising a said optical transmitter on each of said first and second circuit boards and a said light sensing array on each of said first and second circuit boards.

4. The optical interconnect of claim 3, wherein each of said circuit boards comprises a said beam tracking module.

5. The optical interconnect of claim 1, wherein particular light sensing elements of said lights sensing array are designated to receive respective optical beams from each of said optical sources, and wherein the light sensing elements designated to receive an optical beam from a particular optical source are changed in response to said displacement calculated by said beam tracking module.

6. A method of spatially tracking optical beam shift in a light sensing array, said method comprising:
   obtaining a reference reading of said optical beam from said light sensing array;
   obtaining a sample reading from said light sensing array;
   obtaining cross-correlation data between at least a portion of said sample reading and at least a portion of a plurality of shifted versions of said reference reading; and
   calculating a displacement of said optical beam by extrapolating an extremum from said cross-correlation data.

7. The method of claim 6, wherein said method further comprises producing a Gaussian model of said cross-correlation data.

8. The method of claim 7, wherein said extremum is extrapolated from said Gaussian model.

9. The method of claim 6, further comprising creating a new reference reading from said sample reading.

10. The method of claim 6, further comprising demodulating data carried on said optical beam from measurements of said beam in said light sensing array.

11. The method of claim 10, wherein said reference and sample readings are obtained at a faster rate than a frequency of vibrations of a source of said optical beam or said light sensing array, but at a slower rate than said data carried on said optical beam is transmitted to said light sensing array.

12. A method of compensating for optical beam drift, said method comprising:
   associating certain light sensing elements in a light sensing array with each of a respective plurality of optical beams from a transmitter;
   obtaining cross-correlation data between at least a portion of a sample reading from said array and a plurality of shifted versions of at least a portion of a reference reading from said array;
   calculating a displacement of said optical beam by extrapolating an extremum from said cross-correlation data; and
   adjusting the association between said light sensing elements and respective optical beams to compensate for said displacement.

13. The method of claim 12, wherein said method further comprises producing a Gaussian model of said cross-correlation data.

14. The method of claim 13, wherein said extremum is extrapolated from said Gaussian model.

15. The method of claim 12, further comprising creating a new reference reading from said sample reading.

16. The method of claim 12, further comprising demodulating data carried on said optical beam from readings of said beam in said light sensing array.

17. The method of claim 12, wherein said reference and sample readings are obtained at a faster rate than a frequency of vibrations of said transmitter or light sensing array, but at a slower rate than data is transmitted optically to said light sensing array via said optical beams.

18. The method of claim 12, further comprising repeating said steps of obtaining said cross-correlation data and calculating said displacement multiple times to acquire a plurality of displacement measurements.

19. The method of claim 18, further comprising the step of predicting future displacement behavior based on trends identified from said plurality of displacement measurements.

20. The method of claim 19, further comprising adjusting the association between said light sensing elements and respective optical beams to compensate for said predicted future displacement behavior.

* * * * *